(12) United States Patent
Gossett et al.

(10) Patent No.: US 8,368,763 B1
(45) Date of Patent: Feb. 5, 2013

(54) SPECTRUM SENSING ENGINE

(75) Inventors: Carroll Philip Gossett, Mountain View, CA (US); Jeremy Thorpe, Palo Alto, CA (US); Bob D. Nuckolls, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 448 days.

(21) Appl. No.: 12/620,690

(22) Filed: Nov. 18, 2009

Related U.S. Application Data

(60) Provisional application No. 61/163,380, filed on Mar. 25, 2009.

(51) Int. Cl.
*H04N 17/02* (2006.01)

(52) U.S. Cl. ......................................... 348/192; 348/180

(58) Field of Classification Search .......... 375/346–350, 375/296; 348/21; 455/296, 63.1–65, 67.13
See application file for complete search history.

(56) References Cited

U.S. PATENT DOCUMENTS

| | | | |
|---|---|---|---|
| 5,548,339 A | 8/1996 | Kim | |
| 5,877,816 A | 3/1999 | Kim | |
| 5,959,682 A | 9/1999 | Kim et al. | |
| 6,583,822 B1 | 6/2003 | Jun | |
| 6,801,501 B1 * | 10/2004 | Knightly et al. | 370/233 |
| 7,480,009 B2 * | 1/2009 | Cheon et al. | 348/521 |
| 7,751,502 B2 * | 7/2010 | Kwak et al. | 375/326 |
| 8,175,191 B2 * | 5/2012 | Tang | 375/316 |
| 8,228,969 B2 * | 7/2012 | Minamino | 375/130 |
| 2002/0145680 A1 * | 10/2002 | Hong | 348/725 |
| 2006/0007299 A1 * | 1/2006 | Wang et al. | 348/21 |
| 2006/0176980 A1 * | 8/2006 | Lee | 375/321 |
| 2006/0203944 A1 * | 9/2006 | Kwak et al. | 375/343 |
| 2010/0311341 A1 * | 12/2010 | Gaddam et al. | 455/42 |

* cited by examiner

*Primary Examiner* — Jefferey Harold
*Assistant Examiner* — Humam Satti
(74) *Attorney, Agent, or Firm* — Fish & Richardson P.C.

(57) ABSTRACT

Systems, methods, and devices for reducing interference with digital television transmissions occurring over a bandwidth are disclosed. The digital television signal is correlated to a reference digital television field sync signal. A non-coherent correlation power measurement is determined based on the correlation of the received digital television signal to the reference digital television field sync signal. A plurality of maximum non-coherent correlation power measurements are determined over multiple field times. An energy estimate for the digital television transmission is determined based on the maximum non-coherent correlation power measurements. A transmit mask filter is generated based on the energy estimate. The transmit mask is applied to transmissions to reduce interference with detected digital television transmissions.

19 Claims, 6 Drawing Sheets

SPECTRUM SENSING ENGINE

CROSS-REFERENCE TO RELATED APPLICATIONS

This application claims priority under 35 U.S.C. §119(e) to U.S. Provisional Application Ser. No. 61/163,380 titled "Spectrum Sensing Engine" filed Mar. 25, 2009, the disclosure of which is incorporated herein by reference in its entirety.

BACKGROUND

This document relates to electromagnetic spectrum allocation and utilization.

The wireless spectrum is usually available to any wireless device. However, while the wireless spectrum can generally be used by any wireless device, the devices that operate in the wireless spectrum should respect other transmissions that are occurring in the same spectrum. Examples of the other transmissions are digital television signals. Wireless devices can respect other transmissions by operating in a manner that reduces interference with the other transmissions. Interference can be reduced by detecting transmissions in portions of the spectrum and attenuating transmissions in those portions of the spectrum occupied by the detected transmissions.

SUMMARY

In general, one aspect of the subject matter described in this document can be embodied in methods that include the actions of correlating a received digital television signal to a reference digital television field sync signal; determining a non-coherent correlation power measurement based on the correlation of the received digital television signal to the reference digital television field sync signal; accumulating a plurality of maximum non-coherent correlation power measurements over a plurality of field times; determining an energy estimate based on the maximum non-coherent correlation power measurements; and generating a transmit mask filter based on the energy estimate. Other embodiments of this aspect include corresponding systems, apparatus, and computer program products.

These and other implementations can optionally include one or more of the following features. The method can include the actions of shifting a center frequency of the received digital television signal to a reference frequency; filtering the received digital television signal to select a portion of the received digital television signal; and converting a sample rate of the selected portion of the received digital television signal to a system sample rate.

The received digital television signal can be an Advanced Television Systems Committee standard digital television signal. The filter can be a 3 MHz low-pass filter. The correlating can be implemented as the action of filtering the received digital television signal with a finite impulse response filter. The correlation power can be determined through the action of determining a windowed maximum power of the correlation of the received digital television signal to the reference digital television field sync signal.

The windowed maximum power determination can be performed through the actions of determining the windowed maximum power of the correlation of the received digital television signal to the reference digital television field sync signal on a first window of data; and determining the windowed maximum power of the correlation of the received digital television signal to the reference digital television field sync signal on a second window of data, wherein the second window of data comprises a portion of the data from the first window of data.

Particular implementations of the subject matter described in this document can be implemented so as to realize one or more of the following advantages. Digital television transmissions can be detected non-coherently. Transmissions can be attenuated in a portion of the spectrum occupied by a digital television transmission. Available bandwidth for using a wireless device can be dynamically determined.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Wireless Environment

Figure 1:
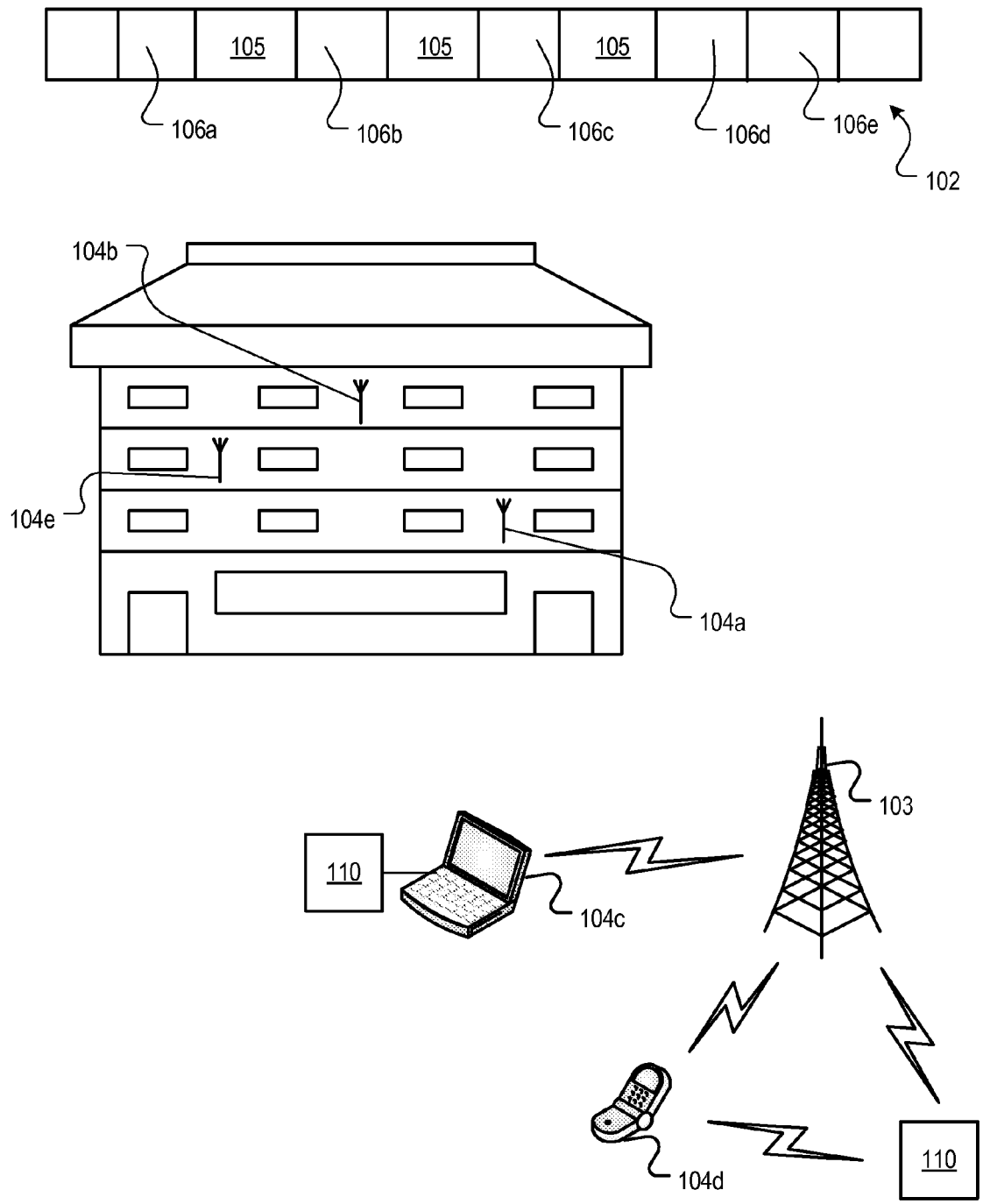
FIG. 1 is an example illustration of devices operating in a spectrum.

FIG. 1 is an example illustration of devices using a spectrum 102. The spectrum 102 can be used, for example, by a television broadcaster 103 that is transmitting a digital television signal. The digital television signal can be, for example, an Advanced Television Systems Committee ("ATSC") standard signal. Each ATSC signal is a licensed use of the spectrum 102 and has priority to transmit in corresponding defined portions 105 of the spectrum 102. However, the number of ATSC signals and the corresponding defined portions 105 of the spectrum 102 occupied by ATSC signals can vary across geographic regions. Similarly, the corresponding defined portions 105 of the spectrum 102 that are occupied by ATSC signals within a particular geographic region (e.g., transmission footprint) can vary over time as television broadcasters 103 add television channels in the particular geographic region.

While ATSC signals have priority to use the spectrum 102, wireless devices 104 can operate (e.g., transmit) in unused portions 106 of the spectrum 102.

However, transmissions from the wireless devices 104 cannot interfere with the ATSC signals that are using corresponding defined portions 105 of the spectrum 102. For example, each of the wireless devices 104a-104e can simultaneously use portions 106a-106e of the spectrum 102, respectively, as long as the wireless devices 104a-104e do not interfere with the ATSC signals occupying the corresponding defined portions 105.

The wireless devices 104a-104e can be fixed or mobile. Mobile wireless devices 104c and 104d (e.g., mobile phones, portable computers, PDAs, etc) can travel in and out of geographic areas that have different ATSC signals occupying the spectrum 102. Therefore, the mobile wireless devices 104c and 104*d* can begin transmitting in a new geographic area at portions of the spectrum 102 that are not occupied by ATSC signals. Similarly, new wireless devices 104 can begin transmitting in the spectrum 102 in a given geographic region where broadcasters are transmitting ATSC signals.

When each of the wireless devices 104*a*-104*e* are transmitting in distinct corresponding portions 106*a*-106*e* of the spectrum 102, there will not be interference between the wireless devices 104*a*-104*e* and the ATSC signals that are using the corresponding defined portions 105 of the spectrum 102. Similarly, when a new wireless device enters the network and selects a portion 106*a*-106*e* of the spectrum 102 not occupied by an ATSC signal, there is no interference between the new wireless device and the ATSC transmissions that occupy the portions 105.

However, without identifying the defined portions 105 of the spectrum 102 that are occupied by ATSC transmissions and avoiding these defined portions 105, the new wireless device may transmit in a defined portion 105 of the spectrum 102 that is already occupied by an ATSC signal and, in turn, cause interference with the ATSC signal. Similarly, when mobile wireless devices 104*c* and 104*d* enter a new geographic region, the mobile wireless devices 104*c* and 104*d* may interfere with ATSC transmissions in portion 105 that were not present in portion 105 in the previous geographic region. Providing data to the wireless devices 104*a*-104*e* that identifies defined portions 105 of the spectrum 102 that are occupied by ATSC transmissions can prevent interfering transmissions from the wireless devices 104*a*-104*e*.

In some implementations, a spectrum sensing engine 110 can be coupled with the wireless devices 104*a*-104*e* that provide data identifying the occupied defined portions 105 of the spectrum 102. In turn, the spectrum sensing engine 110 can generate a transmit mask for each wireless device 104*a*-104*e* that precludes each wireless device from transmitting in an occupied defined portion 105 of the spectrum 102 that would cause interference with ATSC transmissions.

In some implementations, the spectrum sensing engine 110 can be implemented in stationary wireless devices (e.g., desktop computers, routers, repeaters, etc.). In some implementations, the spectrum sensing engine 110 can be implemented in mobile wireless devices (e.g. laptop computers, mobile phones, wireless microphones, etc.). The spectrum sensing engine 110 can be implemented, for example, as a component that is embedded in the wireless devices or as an external module that connects to the wireless device through a communications interface (e.g., USB, Ethernet, RF interface, optical interface, or any other communications interface).

In some implementations, the spectrum sensing engine 110 can identify ATSC transmissions in the spectrum 102 by extracting the energy from an ATSC channel (e.g., defined portions 105 and/or 106*a*-106*e* of the spectrum that corresponds to an ATSC channel band) and determine a non-coherent (e.g., non-synchronized) correlation between the extracted energy and known ATSC field synchronization signals. By extracting the total energy from an ATSC channel, the spectrum sensing engine can identify the presence of an ATSC transmission without recovering a field sync signal that is associated with the ATSC transmission. Therefore, ATSC transmissions can be detected at a lower signal-to-noise ratio ("SNR") than otherwise possible.

§2.0 Example Spectrum Sensing Engine

Figure 2:
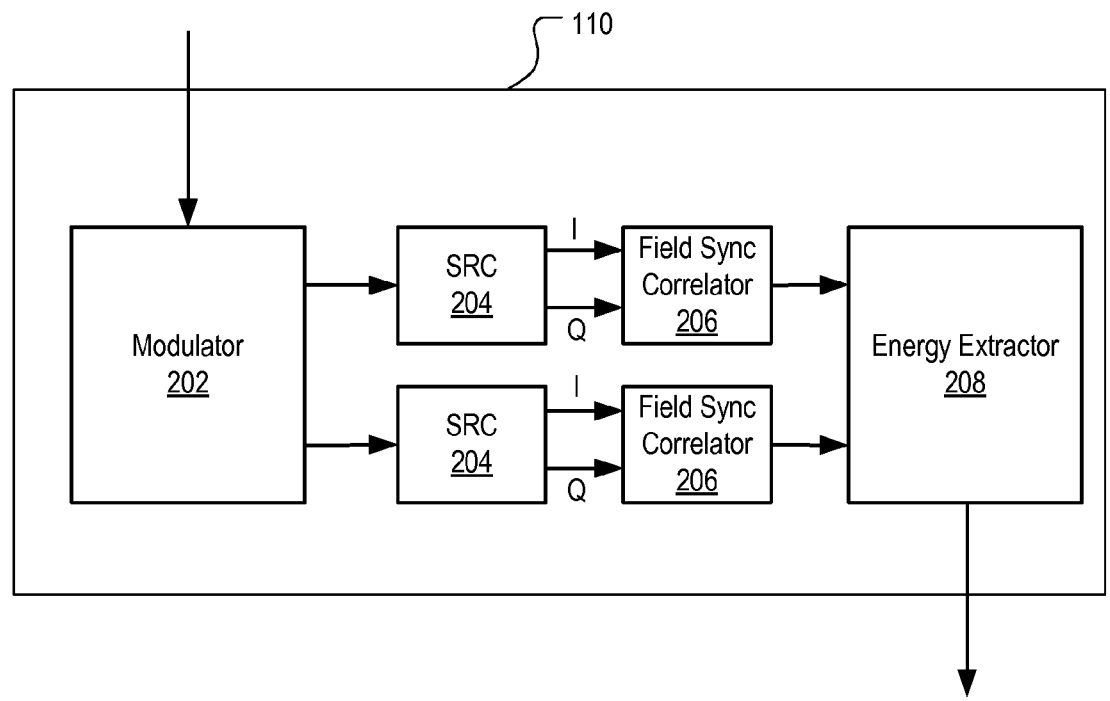
FIG. 2 is a block diagram illustrating an example spectrum sensing engine.

FIG. 2 is a block diagram illustrating an example spectrum sensing engine 110. The spectrum sensing engine 110 can include a modulator 202, a sample rate converter 204, a field sync correlator 206, and an energy extractor 208.

In operation, the spectrum sensing engine 110 can receive a signal at the modulator 202. The received signal can be, for example, a digitized version of an RF transmission. The modulator 202 can select the portion of the received signal (e.g., the ATSC channel) to be analyzed by tuning to the center frequency of the ATSC channel and filtering sideband signals to isolate the ATSC channel. The output of the modulator 202 is the portion of the received signal to be analyzed in quadrature. Each quadrature output of the modulator 202 can be passed to a sample rate converter 204 (SRC).

The sample rate converter 204 can be used to convert the sample rate of each quadrature output of the modulator 202. The real and imaginary components of the quadrature output from the modulator 202 can each be received by a corresponding sample rate converter 204. In turn, each sample rate converter 204 can convert the sample rate of each quadrature output.

In some implementations, the sample rate converter 204 can convert the symbol rate at the output of the modulator 202 from a system sample rate (e.g., 122.2 MHz) to twice the symbol rate of an ATSC signal (e.g., 2*10.7622 MHz) so that an ATSC signal can be accurately decoded. In some implementations, an integer relationship does not exist between the input and the output of the sample rate converter 204. In these implementations, the output is valid after a variable number of system clock cycles that can be determined based on the input symbol rate and the output sample rate.

Each sample rate converter 204 can be implemented with a low order filter (e.g., fourth order) because the input to the sample rate converters 204 has already been low-pass filtered by the modulator 202 and a relatively large conversion is being performed (e.g., 122.MHz/20.12 MHz). Additionally, 12 bits of precision are required such that look up table interpolation may not be necessary. When look up table interpolation is used, the sample rate converter 204 can be implemented to accumulate 32 bits of the phase. The 12 most significant bits of the phase can be used as the phase input to a filter coefficient lookup table.

The output of each sample rate converter 204 can be passed to the field sync correlators 206. The field sync correlator 206 can receive the output of the sample rate converter 204. In some implementations, real and imaginary outputs can be received from sample rate converters 204. In these implementations, the real and imaginary outputs from the sample rate converters 204 can each be received by a corresponding field sync correlator 206. Each field sync correlator 206 filters the received signals using a Finite Impulse Response ("FIR"). In turn, the output of each field sync correlator 206 increases when an ATSC signal is received.

In some implementations, the field sync correlators 206 can determine a non-coherent correlation between the received signal and a reference pseudo-random ATSC field sync signal (e.g., reference digital television signal) that is modeled, for example, by taps of a FIR filter. For example, each field sync correlator 206 can be implemented, as a FIR filter. The taps of the FIR filters can correspond to the pseudo-random ATSC field sync signal to model the reference ATSC field sync signal. Accordingly, when an ATSC field sync signal is received at the input of the FIR filters, there will be an increase in the magnitude of the output of the FIR filters.

The output of each field sync correlator 206 can be passed to the energy extractor 208. The energy extractor 208 can receive the quadrature outputs from the field sync correlators 206 and accumulate a maximum correlation power over ATSC field times. In some implementations, the energy extractor 208 can identify a maximum correlation power by measuring the maximum power in predefined windows (e.g., time windows) of the ATSC field time and accumulating these maximum power measurements into bins that correspond to each window of ATSC field time. When an ATSC signal is present, one or more bins will have a power magnitude that defines a power spike relative to the other bins. This power spike indicates the presence of an ATSC field sync signal and, in turn, an occupied portion 105 of the spectrum 102. When the power spike is detected, a transmit mask filter can be implemented to prevent transmissions in the occupied portion 105 of the spectrum 102 that would interfere with the received signal.

Figure 3:
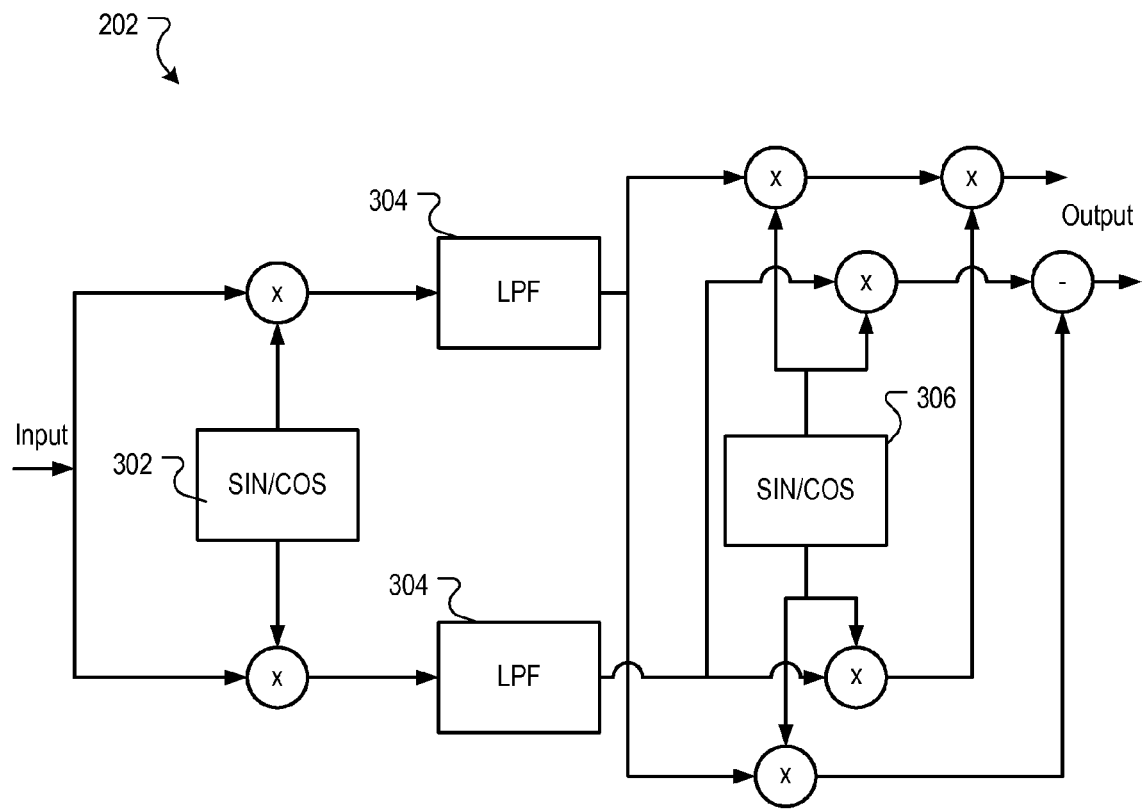
FIG. 3 is a block diagram of an example modulator.

FIG. 3 is a block diagram of an example modulator 202. In some implementations, the modulator can be implemented as a Weaver modulator. A Weaver modulator can tune an ATSC channel by shifting the center frequency of the ATSC channel to DC. The Weaver modulator can shift the center frequency, for example, by mixing the received signal with a low frequency oscillator 302. In some implementations, the shift can be performed to produce a quadrature pair by splitting the received signal and applying a cosine modulation to one tap of the received signal, while applying a sine modulation to the other tap of the received signal.

Each of the quadrature signals can be passed to a low pass filter 304. The low pass filters 304 can be implemented with the same filter characteristics so that the quadrature pair is filtered in the same manner. In some implementations, the low pass filters 304 are implemented as 3 MHz low pass filters (e.g., 6 MHz ATSC channel width/2) because the ATSC channel is centered at DC. This low pass filtering removes unwanted side-bands from the received signal.

The outputs of the low pas filters 304 can be mixed with a high frequency oscillator 306. In some implementations, the high frequency oscillator 306 can include a quadrature pair of oscillators. Each of the low pass filter outputs can be mixed with the sine and cosine oscillators to produce a real and imaginary component for each quadrature pair. In turn, the real component from each quadrature pair can be summed and the imaginary component from each quadrature pair can be subtracted to obtain a quadrature output. As discussed above, the output from the modulator 202 can be passed to the sample rate converter 204.

Although the example modulator 202 shown in a Weaver modulator, other modulators that output the signals described above can also be used.

Figure 4:
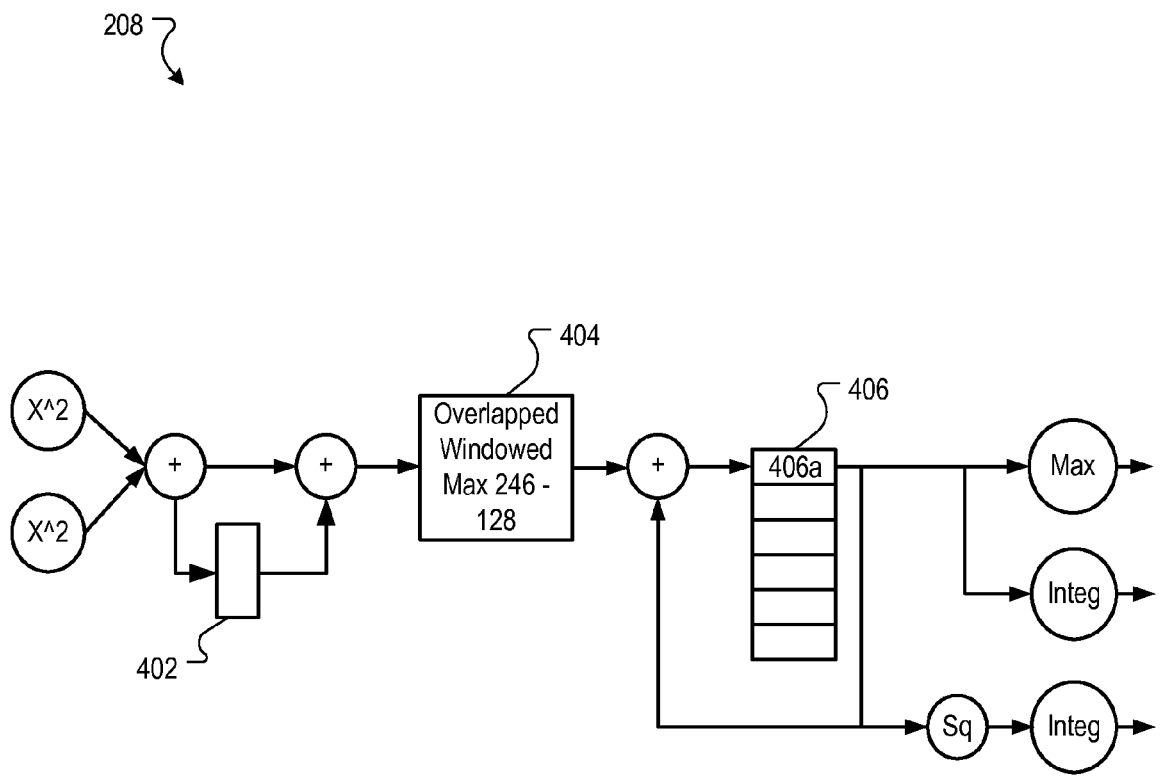
FIG. 4 is a block diagram of an example energy extractor.

FIG. 4 is a block diagram of an example energy extractor 208. In some implementations, the energy extractor 208 can extract a maximum power from the output of the field sync correlators 206. The energy extractor 208 can square and sum real and imaginary components received from the field sync converter 206 to obtain the detected power of the received signal. The detected power of the received signal can be continually obtained over time.

In some implementations, the detected power of the received signal can be combined with a time delayed version of the detected power of the received signal. For example, the first 128 bits of a 256 bit data window of the detected power can be stored in a delay module 402. The delay module can include, for example, a delay register, or array of delay registers, that can store the incoming detected power signal for a defined period of clock cycles. In this example, the first 128 bits of detected power can be combined with the second 128 bits of detected power to form a data window from which a maximum power can be determined. The resulting data window is a 256 bit (e.g., 128 delayed bits and 128 real time samples) data window.

In some implementations, the 256 bit data window can be received by a max power detector 404 that can determine the maximum power for the 256 bit data window. In turn, this maximum power can be stored in a bin 406 that corresponds to the time position of the data window relative to a field time period. For example, the first maximum power that is received from the max power detector 404 can be stored in a first bin 406a. Similarly, each subsequent maximum power received from the max power detector 404 can be stored in separate bins until the cumulative time represented by the data windows satisfies a field time period (e.g., an ATSC field time). In some implementations, 4069 bins can be used so that the max power for each 256 bit data window in ATSC field can be stored in a separate bin 406.

Once the bins 406 each contain a stored max power that corresponds to a 256 bit data window, the cycle repeats, and the next 256 bit data window corresponds to the portion of the field time from which the first 256 bit data window was sampled. Therefore, the accumulated power of this portion of the field time can be determined by adding the newly detected max power for the current 256 bit data window with the stored max power that is contained in bin 406a. Similarly, each subsequent max power can be added to a corresponding stored max power so that the power for each portion of the field time can be accumulated in bins over successive field times.

Accumulating the max power in the bins 406 over successive field times reveals the presence of an ATSC field sync signal in a portion of the spectrum 102 being monitored. As discussed, the output of the filed sync correlators 206 has a greater magnitude when a field sync signal is received. Therefore, the detected power of the output of the field sync correlators 206 will have a greater magnitude when an ATSC field sync signal is present. This increased power magnitude can be detected by the max power detector 404 and stored in the corresponding bin 406. Over time, this increased magnitude will accumulate in the corresponding bin at a faster rate than the power associated with other portions of the field time. Thus, identifying the bin 406 that contains the maximum accumulated power can identify the location of the field sync signal in an ATSC field.

In some implementations, the maximum bin power and power error bars can be determined by performing a Gumbel distribution based on the accumulated powers that are stored in the bins 406. A Gumbel distribution is a particular type of the Fisher-Trippett distribution that is used to determine a minimum or a maximum of a set of samples having varying distributions. The Gumbel distribution can also be used to provide an error bar that is associated with the distribution. Once the maximum energy is determined, second and fourth moments can be extracted.

3.0 Example Process Flow

Figure 5:
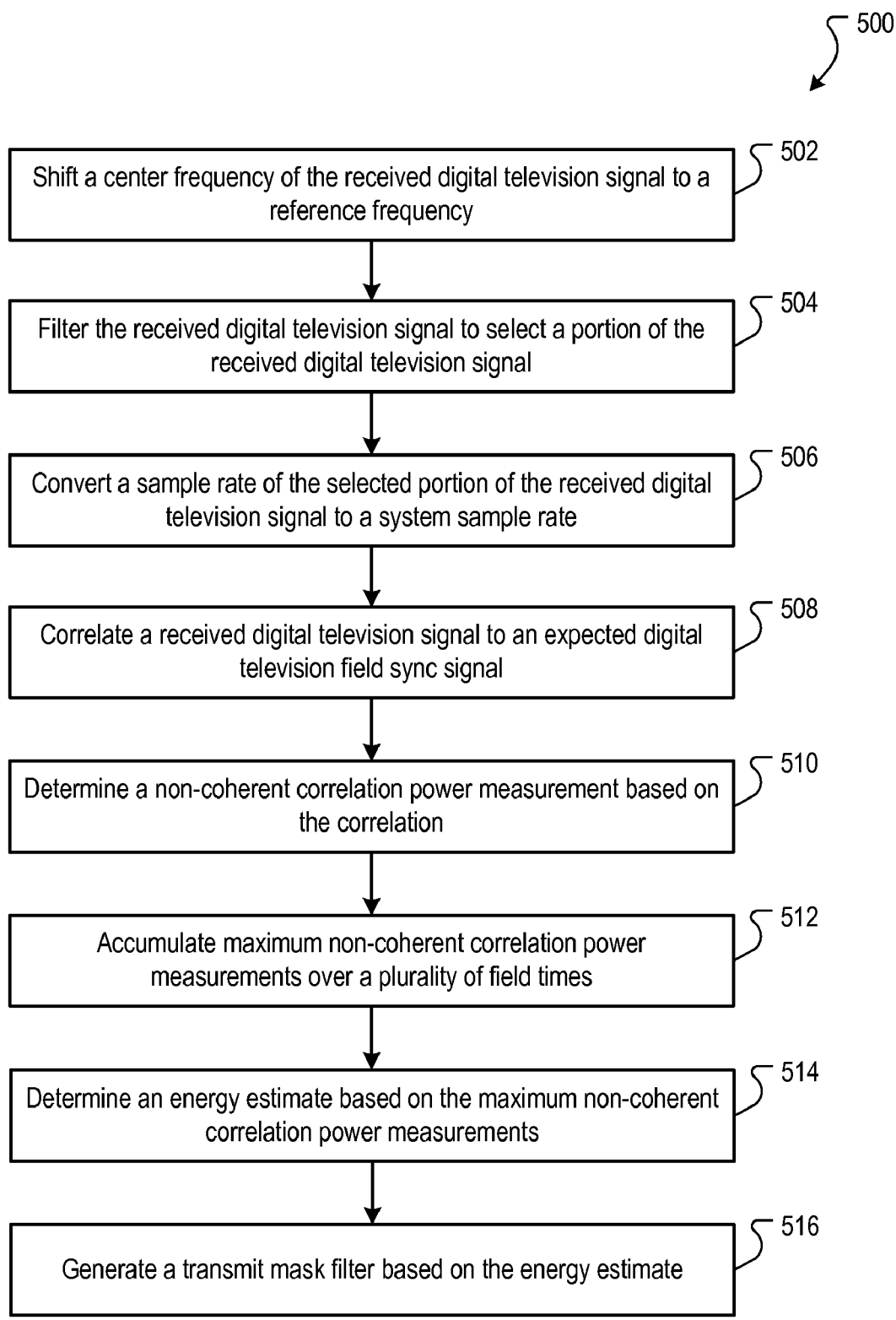
FIG. 5 is a flow chart of an example process of spectrum sensing.

FIG. 5 is a flow chart of an example process 500 of spectrum sensing. The process 500 can be implemented, for example, in the spectrum sensing engine 110 of FIG. 2.

A center frequency of the received digital television signal is shifted to a reference frequency (502). In some implementations, the received digital television signal is an Advanced Television Systems Committee standard digital television signal. The center frequency can be shifted, for example, by the modulator 202.

The received digital television signal is filtered to select a portion of the received digital television signal (504). In some implementations, a 3 MHz portion of the received digital television signal is selected. The received digital television signal can be filtered, for example, by the modulator 202.

A symbol rate of the selected portion of the received digital television signal is converted to a digital television sample rate (506). In some implementations, the symbol rate can be converted from a system sample rate (e.g., 122.2 MHz) to twice the symbol rate of an ATSC signal (e.g., 2*10.7622 MHz) so that the received digital television signal can be accurately decoded. The digital television sample rate can be, for example, a sample rate associated with the Advanced Television Systems Committee standard. The sample rate can be converted, for example, by the sample rate converter 204.

A received digital television signal is correlated to a reference digital television field sync signal. In some implementations, the correlation is non-coherent. The correlation can be performed, for example, by filtering the received digital television signal with a finite impulse response filter. The finite impulse response filter can have tap coefficients that correspond to the reference digital television field sync signal. The correlation can be performed, for example, by the field sync correlator 206.

A non-coherent correlation power measurement based on the correlation is determined (510). In some implementations, the correlation power measurement can be determined by determining a windowed maximum power. The non-coherent correlation power can be determined, for example, by the energy extractor 208.

Maximum non-coherent correlation power measurements over a plurality of field times are accumulated (512). In some implementations, the accumulation can be performed by binning each of the plurality of maximum correlation power measurements into corresponding bins. The accumulation can be performed, for example, by the energy extractor 208.

An energy estimate based on the maximum non-coherent correlation power measurements is determined (514). In some implementations, the energy estimate can be determined by identifying a maximum accumulated power in the corresponding bins. In some implementations, the energy estimate can be determined based on a Gumbel distribution of the non-coherent power. The energy estimate can be determined, for example, by the energy extractor 208.

A transmit mask filter based on the energy estimate is generated (516). In some implementations, the transmit mask filter can be implemented as a finite impulse response filter. The transmit mask filter can be implemented, for example, by the spectrum sensing engine 110. The transmit mask filter is used by a transmitting device so that transmissions over the portions of the occupied spectrum are precluded.

Figure 6:
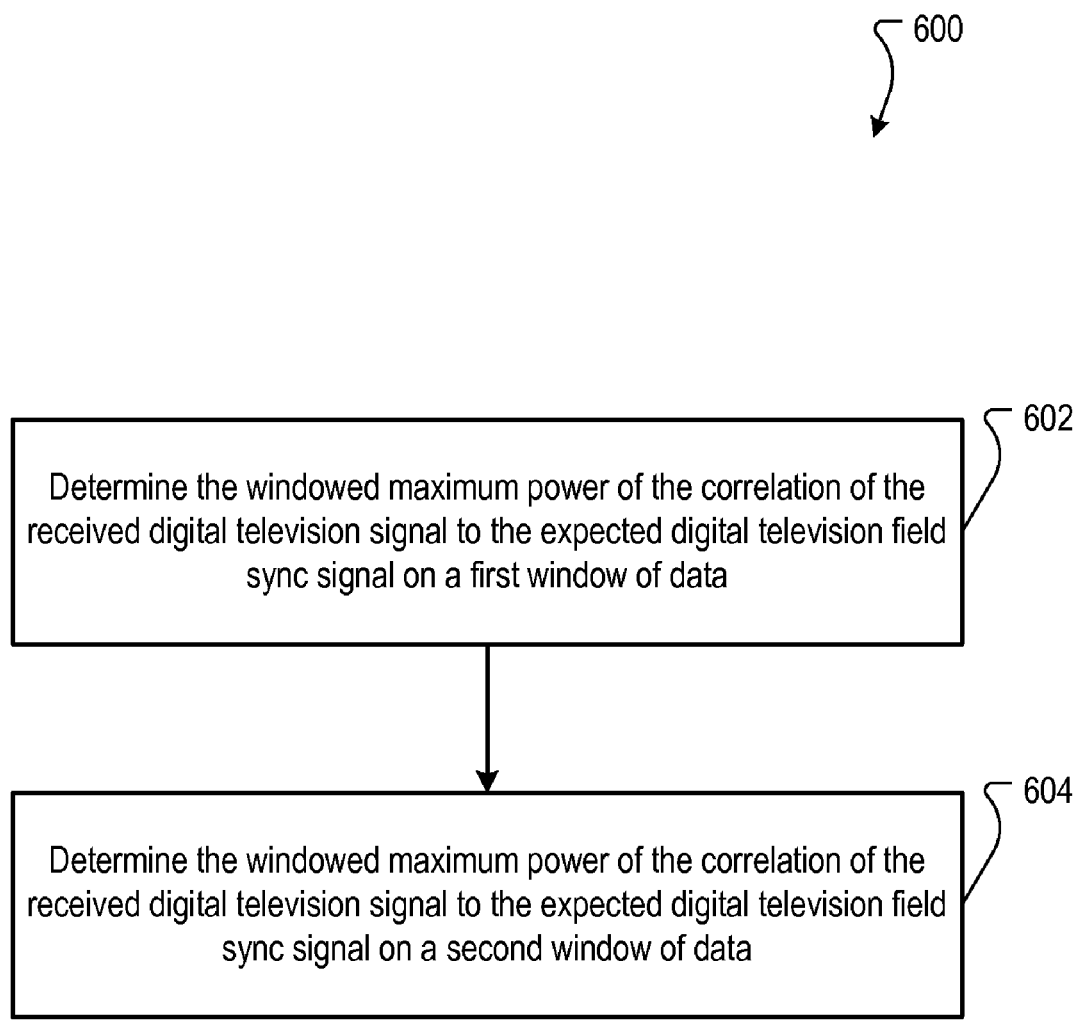
FIG. 6 is a flow chart of an example process of determining a windowed maximum power.

FIG. 6 is a flow chart of an example process 600 of determining a windowed maximum power. The process 600 can be implemented, for example, in the spectrum sensing engine 110 or the energy extraction engine 208 of FIG. 2.

The windowed maximum power of the correlation of the received digital television signal to the reference digital television field sync signal on a first window of data is determined (602). In some implementations, the windowed maximum power can be determined based on 256 samples of data. The windowed maximum power can be determined, for example, by the energy extraction engine 208.

The windowed maximum power of the correlation of the received digital television signal to the reference digital television field sync signal on a second window of data is determined (604). In some implementations, the second window of data can include a portion of the data from the first window of data. For example, the second window of data can include 128 data samples from the first window and 128 new data samples. The maximum power can be determined, for example, by the energy extraction engine 208.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Moreover, a computer can be embedded in another device, e.g., a mobile telephone, a personal digital assistant ("PDA"), a mobile audio or video player, a game console, or a Global Positioning System ("GPS") receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of identifying digital television transmissions, comprising:
    selecting a channel that is defined by a start frequency and a stop frequency;
    correlating a signal received over the channel to a reference digital television field sync signal that is transmitted over a field time period for a digital television broadcast signal, the field time period being an amount of time over which field sync data are transmitted;
    for each of a plurality of field time periods:
        determining, for a first window of data representing the signal received over a first portion of the field time period, a first non-coherent correlation power measure for the first window of data, the first non-coherent correlation power measure being determined based on the correlation of the first window of data to the reference digital television field sync signal;
        storing data representing the first non-coherent power measure in a delay register to create a delayed data sample;
        determining, for a second window of data representing signal received over a second portion of the field time period, a second non-coherent correlation power measure for the second window of data, the second non-coherent correlation power measure being determined based on the correlation of the second window of data to the reference digital television field sync signal;
        combining data representing the second non-coherent correlation power measure with the delayed data sample to create combined power data
    accumulating the combined power data over the plurality of field time periods;
    determining an energy estimate based on the accumulation of the combined power data; and
    generating a transmit mask filter based on the energy estimate.

2. The method of claim 1, further comprising:
    shifting a center frequency of the signal received over the channel to a reference frequency;
    filtering the signal received over the channel to select a portion of the signal; and
    converting a sample rate of the portion of the signal received over the channel to a system sample rate.

3. The method of claim 2, wherein the signal received over the channel comprises an Advanced Television Systems Committee standard digital television signal, and wherein the filter comprises a 3 MHz low-pass filter.

4. The method of claim 1, wherein the correlating comprises filtering the signal received over the channel with a finite impulse response filter.

5. The method of claim 1, wherein accumulating the combined power data over the plurality of field times comprises binning the combined power data for the plurality of field time periods into corresponding bins.

6. The method of claim 5, wherein determining an energy estimate based on the accumulation of the combined power data comprises identifying a maximum accumulated power in the corresponding bins.

7. The method of claim 6, wherein identifying the maximum accumulated power comprises performing a Gumbel distribution analysis of the accumulation of combined power data in the corresponding bins.

8. The method of claim 1, further comprising extracting the second and fourth moments from the energy estimate.

9. A spectrum sensing system, comprising:
    a channel selector to select a channel that is defined by a start frequency and a stop frequency;
    a field sync correlator to determine a non-coherent correlation between a signal received over the channel and a reference digital television field sync signal that is transmitted over a field time period for a digital broadcast signal, the field time period being an amount of time over which field sync data are transmitted; and
    an energy extraction engine coupled to the field sync correlator to determine a non-coherent correlation power measurement by performing operations including:
        for each of a plurality of field time periods:
            determining, for a first window of data representing the signal received over a first portion of the field time period, a first non-coherent correlation power measure for the first window of data, the first non-coherent correlation power measure being determined based on the correlation of the first window of data to the reference digital television field sync signal;
            storing data representing the first non-coherent power measure in a delay register to create a delayed data sample;
            determining, for a second window of data representing the signal received over a second portion of the field time period, a second non-coherent correlation power measure for the second window of data, the second non-coherent correlation power measure being determined based on the correlation of the second window of data to the reference digital television field sync signal;
            combining data representing the second non-coherent correlation power measure with the delayed data sample to create a combined power data;
        accumulating the combined power data over the plurality of field time periods; and
        determining an energy estimate based on the accumulation of the combined power data.

10. The system of claim 9, further comprising:
a modulator to shift a center frequency of the signal received over the channel to a reference frequency and filter the signal received over the channel to select a portion of the signal received over the channel; and
a sample rate converter coupled to the modulator to convert a sample rate of the selected portion to a system sample rate.

11. The system of claim 10, wherein the signal received over the channel comprises an Advanced Television Systems Committee standard digital television signal, and wherein the filter comprises a 3 MHz low-pass filter.

12. The system of claim 9, wherein the correlator comprises a finite impulse response filter.

13. The system of claim 9, wherein the energy extraction engine accumulates the combined power data for the plurality of field time periods into corresponding bins.

14. The system of claim 13, wherein the energy estimate is a maximum accumulated power in the corresponding bins.

15. The system of claim 14, further comprising identifying the maximum accumulated power comprises based on a Gumbel distribution analysis of the accumulation of combined power data in the corresponding bins.

16. The system of claim 9, wherein the energy extraction engine is further operable to extract the second and fourth moments from the energy estimate.

17. The system of claim 9, further comprising a transmit mask filter to control an output of a transmitter based on the energy estimate.

18. A device, comprising:
means for selecting a channel that is defined by a start frequency and a stop frequency;
a field sync correlator to determine a non-coherent correlation between a signal received over the channel and a reference digital television field sync signal that is transmitted over a field time period for a digital television broadcast signal, the field time period being an amount of time over which field sync data are transmitted;
means for determining, for a first window of data representing the signal received over a first portion of the field time period, a first non-coherent correlation power measure for the first window of data, the first non-coherent correlation power measure being determined based on the correlation of the first window of data to the reference digital television field sync signal;
means for storing data representing the first non-coherent power measure in a delay register to create a delayed data sample.
means for determining, for a second window of data representing the signal received over a second portion of the field time period, a second non-coherent correlation power measure for the second window of data, the second non-coherent correlation power measure being determined based on the correlation of the second window of data to the reference digital television field sync signal;
combining data representing the second non-coherent correlation power measure with the delayed data sample to create combined power data
means for accumulating the combined power data over a plurality of different field time periods; and
means for determining an energy estimate based on the accumulation of combined power data over the plurality of different field times.

19. The device of claim 18, further comprising a transmit mask filter defined based on the energy estimate.

* * * * *

UNITED STATES PATENT AND TRADEMARK OFFICE
CERTIFICATE OF CORRECTION

PATENT NO. : 8,368,763 B1
APPLICATION NO. : 12/620690
DATED : February 5, 2013
INVENTOR(S) : Carroll Philip Gossett, Jeremy Thorpe and Bob D. Nuckolls It is certified that error appears in the above-identified patent and that said Letters Patent is hereby corrected as shown below:

In the Claims:

Claim 1, Column 9, Line 51 – delete "representing" and insert -- representing the --, therefor.

Claim 1, Column 9, Line 61 – delete "data" and insert -- data; --, therefor.

Claim 18, Column 12, Line 14 – delete "sample." and insert -- sample; --, therefor.

Claim 18, Column 12, Line 25 – delete "data" and insert -- data; --, therefor.

Signed and Sealed this
Twenty-first Day of May, 2013

Teresa Stanek Rea
*Acting Director of the United States Patent and Trademark Office*